United States Patent [19]

English et al.

[11] Patent Number: 4,536,831
[45] Date of Patent: Aug. 20, 1985

[54] REPLACEMENT LAMP WITH MEANS FOR SPACING

[75] Inventors: George English, Reading; Stephen J. Leadvaro, Salem, both of Mass.

[73] Assignee: GTE Products Corporation, Stamford, Conn.

[21] Appl. No.: 629,133

[22] Filed: Jul. 9, 1984

[51] Int. Cl.³ ............................................. F21V 15/00
[52] U.S. Cl. .................................... 362/263; 362/267; 362/310; 362/297; 362/368; 313/115
[58] Field of Search ............... 362/267, 297, 310, 368, 362/307, 263; 313/113-115, 243, 244

[56] References Cited

U.S. PATENT DOCUMENTS

| | | | |
|---|---|---|---|
| 780,613 | 1/1905 | Meyers | 313/115 X |
| 2,056,631 | 10/1936 | Uxterhoeven et al. | 313/115 X |
| 2,617,062 | 11/1952 | Rijnders | 313/115 X |
| 3,023,667 | 3/1962 | Lessman | 313/115 X |
| 3,293,475 | 12/1966 | Grunning et al. | 313/115 X |
| 3,343,021 | 9/1967 | Burnett et al. | 313/115 X |
| 3,908,144 | 9/1975 | Rudd | 313/115 X |
| 4,264,840 | 4/1981 | Kuhnert et al. | 313/115 X |
| 4,329,614 | 5/1982 | Szekacs | 313/115 X |
| 4,338,540 | 7/1982 | Sovilla | 313/220 |

FOREIGN PATENT DOCUMENTS

| | | | |
|---|---|---|---|
| 67932 | 6/1940 | Czechoslovakia | 313/115 |
| 1263086 | 6/1960 | France | 313/115 |

Primary Examiner—Peter A. Nelson
Attorney, Agent, or Firm—José W. Jimenez

[57] ABSTRACT

A lamp member is adapted for use in a lighting unit having a light transmitting cover. The lamp member comprises a base, a tungsten-halogen capsule supported within the base, a first envelope, and a filament structure axially oriented with the first envelope. The lamp member further includes spacer means for maintaining the lamp member and the cover in a spaced-apart relationship when the lamp member is in the spring-biased position within the housing. The spacer means is secured to the lamp member and is in operative contact with the cover. One example of the spacer means is a cylindrical cap made of a ceramic material, the cap being disposed at the top of the capsule and secured thereon. The cylindrical cap is dimensioned so that the size of the replacement lamp is substantially the same size as prior incandescent lamps of which the invention is designed to replace.

18 Claims, 5 Drawing Figures

REPLACEMENT LAMP WITH MEANS FOR SPACING

CROSS-REFERENCE TO CO-PENDING APPLICATIONS

Reference is made to co-pending applications, under U.S. Ser. Nos. 629,132 and 629,131, filed 7/9/84 concurrently herewith and assigned to the assignee of this application, which contain related subject matter.

TECHNICAL FIELD

The present invention relates in general to an improved replacement lamp and lamp unit that has an enhanced beam intensity in comparison with present lamp units operated at comparable wattage. More particularly, the present invention pertains to a replacement lamp of high luminance, relatively low wattage, tungsten-halogen type, for replacing present incandescent lamps in lamp units. Examples of such units include those used in mining operations (e.g., as a light in a miner's cap).

BACKGROUND

One known example of an incandescent miner's cap lamp includes a base, a bulb, and a pair of tungsten filaments of the cross-axis, coil type.

DISCLOSURE OF THE INVENTION

It is an object of the present invention to provide an improved replacement lamp, having an enhanced beam intensity and wider main beam coverage, particularly in comparison with present lamps operating at comparable wattage.

Another object of the present invention is to provide a lamp that is a replacement for existing state-of-the-art incandescent lamps.

A further object of the present invention is to provide a replacement lamp for a miner's cap in which the previous incandescent cap lamp fixture may still be employed.

A further object of the present invention is to provide an improved replacement lamp in which the replacement lamp has high average luminance at relatively low wattage and is preferably of the double filament tungsten-halogen type.

In accordance with one aspect of the present invention, there is provided a lamp member adapted for use in a lighting unit having a light-transmitting cover. The lamp member includes a base shell member, a tungsten-halogen capsule having a wedge base portion secured to the base shell member and having a first envelope with an inert gas fill and a halogen disposed therein. The lamp member further includes spacer means for maintaining the first envelope and the light-transmitting cover in a spaced-apart relationship. The spacer means is in operative contact with the light-transmitting cover and is located between the first envelope and the cover.

In accordance with another aspect of the present invention, there is provided a lamp unit utilizing a replaceable lamp member. The lamp unit includes a housing, a reflector positioned within the housing and defining an open end, a light-transmitting member for providing a cover for the open end and a lamp member positioned within the housing in a spring-biased manner. The lamp member of the invention includes a base, a tungsten-halogen capsule secured to the base having a first envelope located substantially within the reflector and a filament structure axially oriented within the first envelope. The lamp member further includes means for spacing the lamp member from the light-transmitting member when the lamp member occupies the spring-biased position within the housing. The spacer means is secured to the lamp member and is in operative contact with the light-transmitting member.

BEST MODE FOR CARRYING OUT THE INVENTION

For a better understanding of the present invention together with other and further objects, advantages and capabilities thereof, reference is made to the following disclosure and appended claims in conjunction with the above described drawings.

Figure 1:
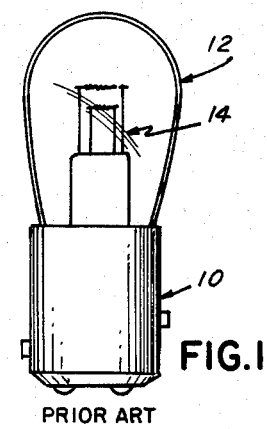
FIG. 1 illustrates one example of a prior-art incandescent lamp.
Figure 2:
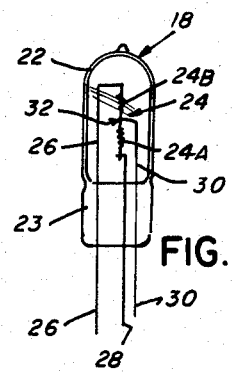
FIG. 2 shows the tungsten-halogen capsule utilized in this invention.
Figure 3:
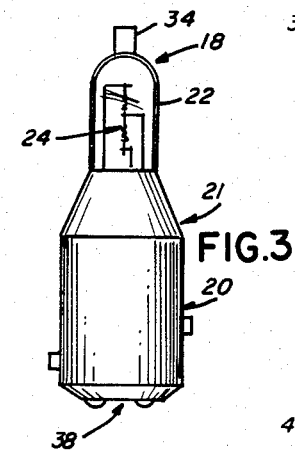
FIG. 3 shows one step of assembly of a lamp member of this invention, illustrating the tungsten-halogen capsule disposed in a lamp base and supporting thereover a spacer member.

With reference now to the drawings, there is shown, particularly in FIG. 2, a low-wattage double filament tungsten-halogen lamp capsule 18. The lamp member 21 of FIG. 3 shows the capsule 18, which includes a first envelope or bulb 22, supported in a base shell member 20. The capsule 18 further includes an inert gas fill and a halogen disposed within. A filament structure 24 is axially located within the first envelope 22 and is supported by wedge base portion 23. As illustrated in FIG. 2, the first envelope 22 has a press-seal end, forming wedge base portion 23, through which the leads 26, 28 and 30 extend. The leads 26, 28 and 30 connect to base shell member 20 and to base contacts 38, associated with the base shell member 20 in a conventional manner.

Leads 26, 28 and 30, in FIG. 2, are connected to the filament structure 24 and serve to provide support therefor. The filament structure 24 includes coiled filament members 24A and 24B, each located in an end to end manner. Support lead 26 is conductively coupled to the top of coiled filament member 24B and support lead 28 is conductively coupled to the bottom of coiled filament member 24A. Filament members 24A and 24B in one embodiment, are electrically connected in series. Support lead 30 is connected to an intermediate member 32 that intercouples coiled filaments 24A and 24B. Due to the three lead configuration, it is also possible to selectively activate either of the filament members 24A and 24B, or, alternatively, to operate both filaments simultaneously. The filament members 24A and 24B and the intermediate member 32 are all formed from a single wire.

Figure 4:
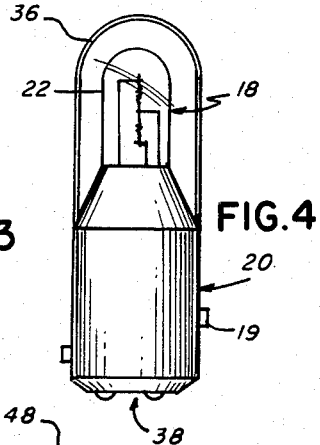
FIG. 4 shows an embodiment of the lamp member of this invention, with a second envelope supported from the base and formed over the capsule's envelope.

FIGS. 3 and 4 illustrate the embodiments of the spacer means and protective spacer means, respectively, of the invention. The lamp member 21 of FIG. 3 illustrates both the capsule 18 and two base contacts 38, for selectively activating filament members 24A and 24B, in place in the base shell member 20. A spacer member 34 is secured to the top of the envelope 22 of the capsule 18. The spacer member 34 is of cylindrical shape and may be secured to the envelope 22 by appropriate adhesive means (i.e., ceramic cement). The spacer or cylindrical cap member 34 can be provided in different lengths to accommodate different sizes of lamp housings. The cap member 34 is of a ceramic material, or alternatively, can be molded from plastic.

FIG. 4 shows one embodiment of the assembled lamp with a second envelope 36 supported from the base shell member 20 and protectively enclosing the capsule 18 and its associated first envelope 22. As indicated previously, the spacer member 34 or the second envelope 36 may be dimensioned so that the lamp member can be positioned in various-sized lamp housings. Bayonet lugs 19 are provided on base shell member 20 to allow the lamp member to be placed in a mining lamp unit.

Figure 5:
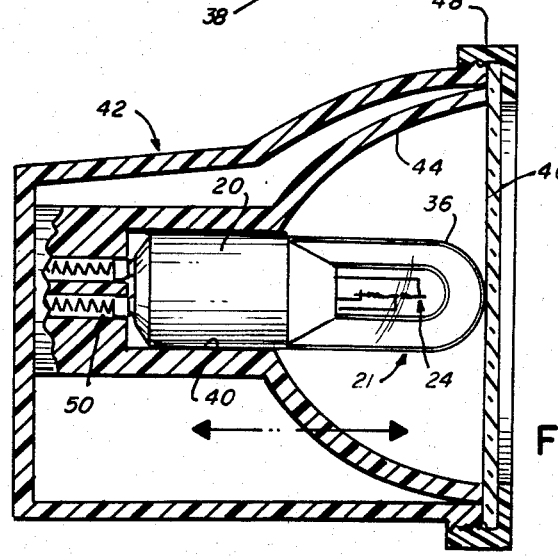
FIG. 5 shows a lamp unit in accordance with a preferred embodiment of this invention.

FIG. 5 illustrates the lamp of the present invention, shown in FIG. 4, with its base shell member 20 received in the neck portion or socket 40 of the lamp housing 42. The housing 42 supports an adjustable reflector 44, and furthermore supports at the front thereof a light-transmitting cover member 46. Cover 46 could be either a plate or lens made of glass or plastic. A screw ring member 48 may typically be used for holding the cover 46 in place. Adjustable reflector 44 allows for the positioning of the reflector's focal point over the filament member that is presently activated.

It is noted in FIG. 5 that base shell member 20 is supported in the socket 40 under spring-bias provided by spring contacts 50. The second envelope 36 illustrated is used as a protective spacer for lamp 21 to form part of a safety switch arrangement. If the cover 46 is broken, which can occur in a rugged environment (i.e., mining), the spring contacts 50 will force the lamp 21 forward, breaking electrical contact between the spring-loaded contacts 50 and base contacts 38. This removes power from the lamp and prevents any arcing should the envelope 36 or capsule 18 therein also break.

The spacer member 34 in FIG. 3 is also used as a spacer for lamp 21, as an alternative to using second envelope 36, to form a part of the safety switch arrangement illustrated in FIG. 5. The springs in spring contacts 50 are also designed for accommodating lamps of sightly different lengths due to manufacturing tolerance, thermal expansion and other factors. The main purpose of the spacer means is to maintain the correct overall length of the lamp when placed in a lamp housing similar to housing 42. A secondary purpose is to protect the relatively fragile tip-off of capsule 18 from damage.

EXAMPLES

In accordance with one embodiment of the invention, a lamp having a first envelope, made of hardglass, having an overall length of 4.5 centimeters (cm) and an outer diameter of 0.7 cm was produced. The cylindrical cap member, made of ceramic, had an overall length of 0.5 cm and a diameter of 0.7 cm. The cap member was secured to the top of the first envelope with the use of Sauereisen No. 8 cement.

In another embodiment of the invention, a lamp included a first envelope, made of hardglass and having the aforementioned dimensions was produced. The corresponding second envelope, which surrounded the first envelope, had an overall length of 4.5 cm and an outer diameter of 1.9 cm. The second envelope also provided protection for the tungsten-halogen capsule itself, since the contents were under high pressure and breakage would be undesirable in a mining environment.

There has thus been shown and described a spacer means that allows a lamp member to maintain a spaced-apart relationship between the first envelope and the light-transmitting cover when the lamp member is in the spring-biased portion within the lamp housing.

While there have been shown and described what are at present considered the preferred embodiments of the invention, it will be obvious to those skilled in the art that various changes and modifications may be made therein without departing from the scope of the invention as defined by the appended claims.

What is claimed is:

1. A lamp member adapted for use in a lighting unit having a light-transmitting cover, said lamp member comprising:
    a base shell member;
    a tungsten-halogen capsule having a wedge base portion secured to said base shell member, said capsule including a first envelope with an inert gas fill and halogen disposed therein, a filament structure axially located within said first envelope and supported by said wedge base portion; and
    spacer means for maintaining said first envelope and said light-transmitting cover in a spaced-apart relationship, said spacer means in operative contact with said cover and located between said first envelope and said cover.

2. The lamp member according to claim 1 wherein said spacer means further provides means for protecting said first envelope.

3. The lamp member according to claim 2 wherein said protective spacer means is a second envelope located about said first envelope and secured to said base.

4. The lamp member according to claim 3 wherein said second envelope is glass.

5. The lamp member according to claim 1 wherein said spacer means is a cylindrical cap member disposed at the top of said first envelope.

6. The lamp member according to claim 5 wherein said cylindrical cap member is of ceramic material.

7. The lamp member according to claim 5 wherein said cylindrical cap member is plastic.

8. A lamp unit comprising:
    a housing;
    a reflector positioned within said housing and defining an open end;
    a light-transmitting member for providing a cover for said open end; and
    a lamp member positioned within said housing in a spring-biased manner, said lamp member including a base, a tungsten-halogen capsule secured to said base and having a first envelope located substantially within said reflector, a filament structure axially oriented within said first envelope, and means for spacing said lamp member from said light-transmitting member when said lamp member occupies said spring-biased position within said housing, said spacer means secured to said lamp member and in operative contact with said light-transmitting member.

9. The lamp unit according to claim 8 wherein said spacer means further provides means for protecting said first envelope.

10. The lamp unit according to claim 9 wherein said protective spacer means comprises a second envelope located about said first envelope and secured to said base of said lamp member.

11. The lamp unit according to claim 10 wherein said second envelope is glass.

12. The lamp unit according to claim 8 wherein said spacer means is a cylindrical cap member disposed at the top of said first envelope.

13. The lamp unit according to claim 12 wherein said cap member is of a ceramic material.

14. The lamp unit according to claim 12 wherein said cylindrical cap member is plastic.

15. The lamp unit according to claim 8 wherein said reflector includes a neck portion having an aperture therein, said lamp unit further including first and second spring contacts located within said neck portion in a spaced-apart manner, said base of said lamp member further including first and second base contacts for engaging said first and second spring contacts, respectively, when said lamp member is positioned within said housing.

16. The lamp unit according to claim 8 wherein said axial filament structure includes at least two coiled filament members located in an end to end manner and formed from a single wire intercoupled by an intermediate member, each of said filament members including a central portion and two opposed end portions.

17. The lamp unit according to claim 8 wherein said first envelope of said lamp member is hardglass.

18. The lamp unit according to claim 8 wherein said light-transmitting member is a lens.

* * * * *